A. SWASEY.
SIGHT DEVICE FOR FIREARMS.
APPLICATION FILED JUNE 8, 1908.
906,751.
Patented Dec. 15, 1908.
3 SHEETS—SHEET 1.
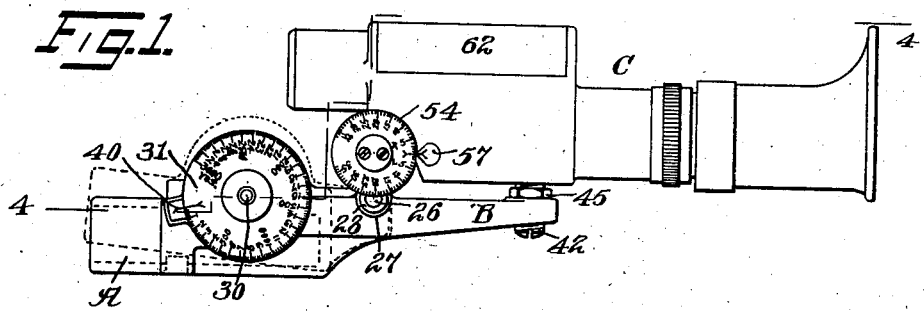
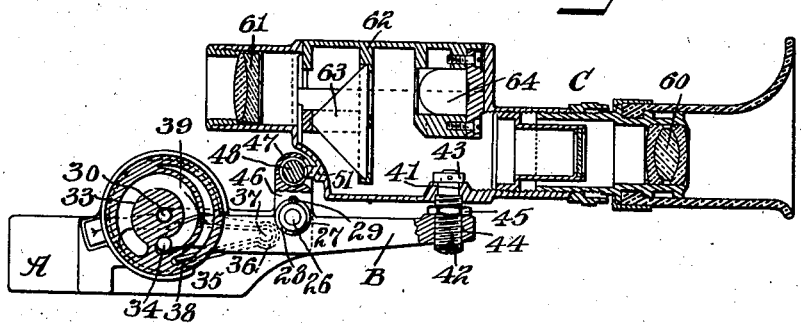
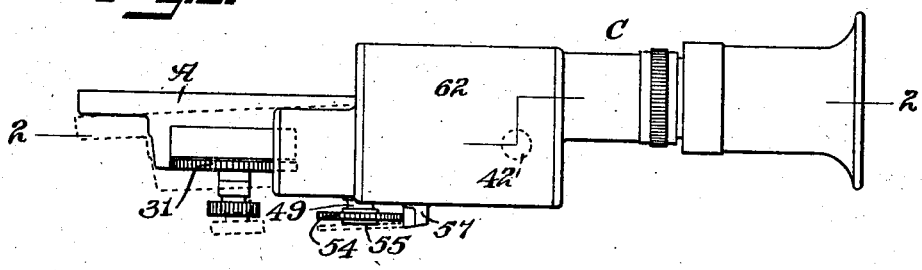
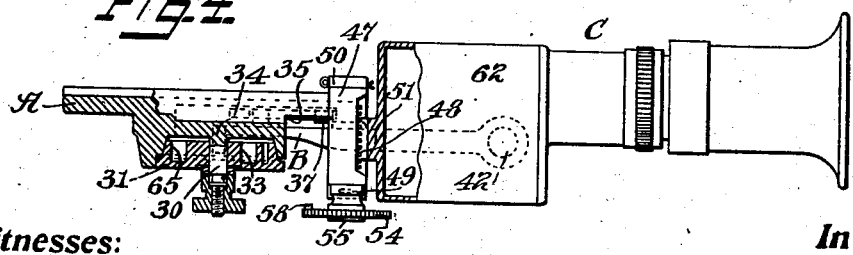
Witnesses:
C. C. Fuss.
H. D. Penney.
Inventor:
Ambrose Swasey,
By his Attorney,
F. H. Richards.

A. SWASEY.
SIGHT DEVICE FOR FIREARMS.
APPLICATION FILED JUNE 8, 1908.
906,751.
Patented Dec. 15, 1908.
3 SHEETS—SHEET 2.
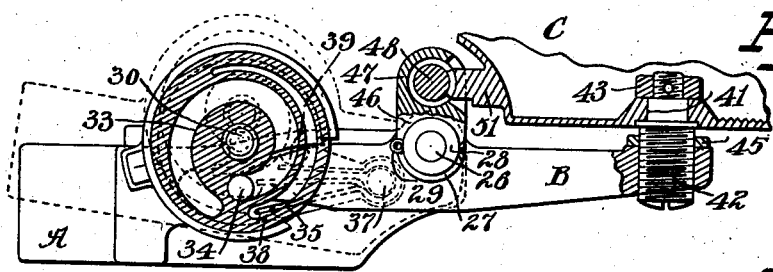
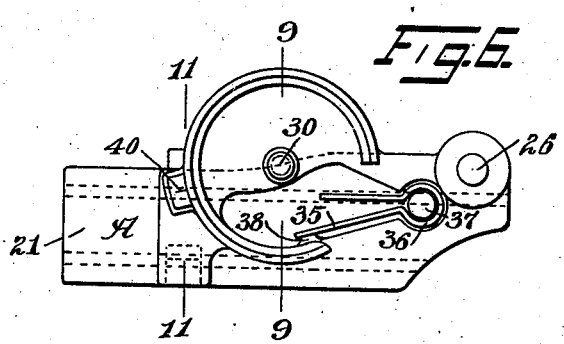
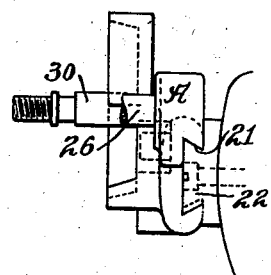
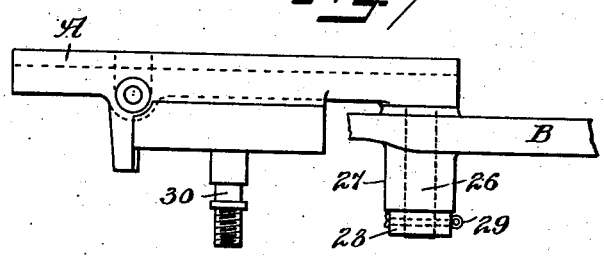
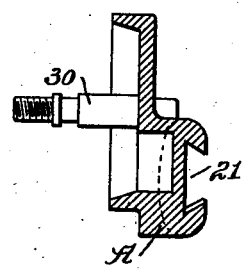
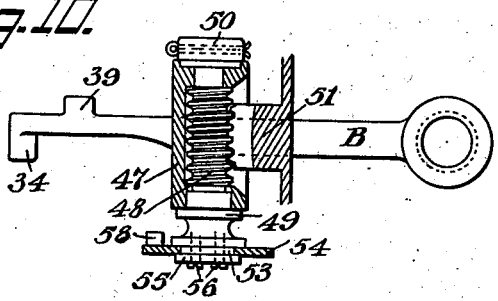
Witnesses:
Inventor:
Ambrose Swasey,
By his Attorney, A. SWASEY.
SIGHT DEVICE FOR FIREARMS.
APPLICATION FILED JUNE 8, 1908.
906,751.
Patented Dec. 15, 1908.
3 SHEETS—SHEET 3.
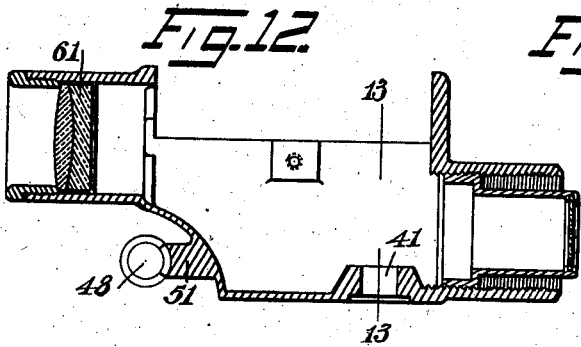
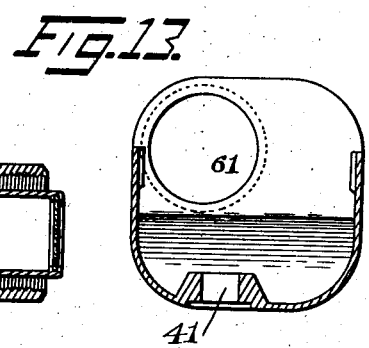
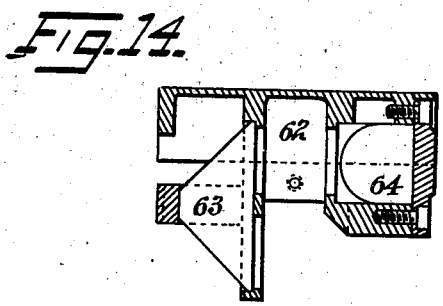
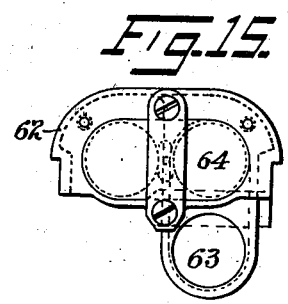
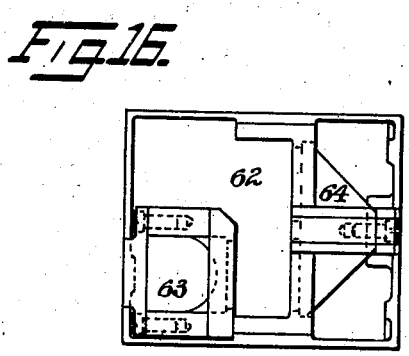
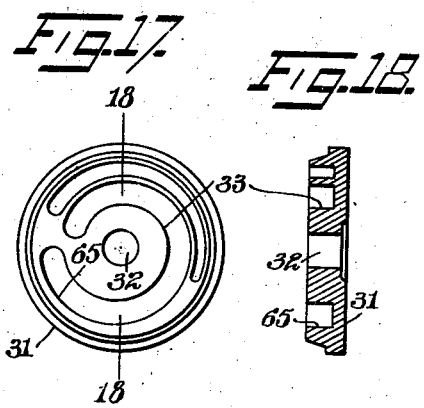
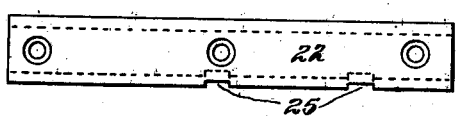
Witnesses:
Inventor:
Ambrose Swasey,
By his Attorney,
F. H. Richards.

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

SIGHT DEVICE FOR FIREARMS.

No. 906,751.  Specification of Letters-Patent.  Patented Dec. 15, 1908.

Application filed June 8, 1908. Serial No. 437,275.

*To all whom it may concern:*

Be it known that I, AMBROSE SWASEY, a citizen of the United States, residing in Cleveland, in the county of Cuyahoga and State of Ohio, have invented certain new and useful Improvements in Sight Devices for Firearms, of which the following is a specification.

This invention appertains to sighting devices, and is especially designed for rifles or muskets.

One of the objects of the invention is to provide an improved form of sight device of this character, wherein an index member or head will have its graduations approximately uniformly spaced, corresponding to the different elevations, and by the substantially equal movement of this head for the different elevations, the sight will be given a varied angular swing, as is necessary for the different elevations.

A further object of the invention is to provide means for swinging the sight device on its support, in which there will be a positive movement to the swinging member in both directions to prevent any free movement of the sight device from the recoil of the gun, and at the same time the engaging member connected with the sight will be retained in engagement with the surface or cam that effects its movement.

A further object of the invention is to provide a supplementary swing of the sight device for the purpose of collimation of the instrument, both initial and for the purpose of readjustment after use.

An object of the invention is to provide in addition to the swing of the sight device for elevation, a construction whereby the sight device can be swung on a vertical axis for windage or drift.

In the accompanying drawings representing embodiments of my invention, Figure 1 is a side elevation of the device. Fig. 2 is a section on the line 2—2 indicated in Fig. 3. Fig. 3 is a plan view. Fig. 4 is a section on the line 4—4 indicated in Fig. 1. Fig. 5 is a vertical section enlarged showing the support and the lever, and the engaging portion of the sight member. Fig. 6 is a side elevation of the support, also showing the lever spring. Fig. 7 is a plan view of the support, showing the trunnion portion of the lever. Fig. 8 is an end view of the support indicating the attachment to the firearm. Fig. 9 is a vertical section on the line 9—9 indicated in Fig. 6. Fig. 10 shows the lever in plan, with the screw and tooth member for swinging the sight member on the lever shown in section. Fig. 11 is a section on the line 11—11 indicated in Fig. 6. Fig. 12 is a vertical section enlarged through the shell of the sight device. Fig. 13 is a transverse section on the line 13—13 indicated in Fig. 12. Fig. 14 is a vertical section through the removable prism holder, the prisms being shown in plan. Fig. 15 is an end view of the holder shown in Fig. 14. Fig. 16 is a bottom plan view of the holder shown in Fig. 14. Fig. 17 is a view of the inner side of the index member. Fig. 18 is a transverse section through the index member on the line 18—18 indicated in Fig. 17. Fig. 19 shows the bar for securing the support to the firearm, and Fig. 20 is an end view of the bar shown in Fig. 19.

The device is shown as comprising essentially three members; a support, a sighting member or telescope, and a lever, that is pivoted on the support, and to which the sighting member is adjustably secured. The support denoted generally by A, is shown separately in Fig. 6, and also in Fig. 7 with the lever attachment. On the rear of the support is a dove-tail channel 21 in which slides a bar 22 similarly shaped, as shown in Fig. 20; the bar being secured to the gun by screws or otherwise, as indicated in Fig. 8. If desired, the support may be adjustable along the bar, and locked in different positions by having a detent 23 pressed by spring 24 into notches 25 in the bar 22, as indicated in Fig. 11.

The support A carries a spindle portion 26 on which swings the trunnion portion 27, of the lever B. A washer 28 holds the trunnion on the shaft, being locked by a cotter-pin 29. The sighting member or telescope denoted generally by C, is secured to the lever B, and by rocking the lever on its trunnion support, the sighting device will swing through a vertical plane, to adjust for different elevations.

The frame member A carries a spindle 30, on which turns an index member 31, engaging the spindle by its bore 32. The index member has a cam portion 33 that engages a lug 34 on the lever B. This lug is pressed against the cam by a spring 35, shaped somewhat like an open cotter-pin, having an eye 36 passing around a lug 37, on the support A. One end of the spring engages the frame member at 38, while the other end engages a lug 39 on the lever and presses the lug 34 against the cam. But preferably a second cam surface 65 is provided opposite said cam, and spaced therefrom a distance about equal to the diameter of the pin 34, thereby forming a cam slot. This is to prevent undue vibration of the lever from the recoil of the gun, which might follow if a single cam surface were used. The spring tends to retain the pin against the inner cam wall and accuracy of adjustment results by this constant engagement. The front of the index member is provided with graduations adjacent its margin as shown in Fig. 1, the graduations being substantially equally spaced, and corresponding indications are placed thereon, each space representing twenty yards of range. And the cam is shaped or plotted to swing the sighting member on the trunnion axis the necessary amount for each range; which will be a variable amount of swing. This has great advantages over the former methods of swinging the telescope by means of a screw, as equal amounts of rotative movement would not give the proper swing to the telescope for different range adjustments. An index pointer 40 on the support registers with the graduations on the index.

The sighting device C is shown as adjustable on the lever for windage or drift, and swings on an axis perpendicular with the axis of the lever B. The sighting device or telescope member C has an aperture 41 in its lower portion in which swings a pivot member 42, having a retaining collar 43 on its end portion. The pivot is threaded, and screws in a threaded bore 44 in the rear end of the lever B, and a lock-nut 45 serves to clamp the screw in adjusted position on the lever. The lever B has an extension 46 carrying a tubular arm 47, in whose bore rotates a screw member 48 having a head portion 49 at one end, and a locking collar 50 at the other end; preventing endwise movement of the screw. On the telescope member C, is an extension 51 that contains teeth in the nature of a gear segment centered in pivot 42; which teeth mesh with the thread of the screw 48. These two members upon rotation of the screw have the function of a worm and worm-wheel, the screw corresponding to a worm, and the segment to a worm wheel. Therefore, when the screw is turned, the telescope member will swing on the pivot member 42. The screw member has on its head 49 a boss 53, on which is slipped an annular index disk 54, that is secured by a retaining disk 55 apertured for the passage of locking screws 56, tapped into the head. By this means the index disk can be set to the proper position and then clamped by the screws. This index is provided with graduations as shown in Fig. 1 that register with a pointer 57. A lug 58 on the back of the disk permits a limited turning in both directions from the zero position. By turning the index member, that is preferably provided with a milled edge, the telescope member can be swung to either side of the normal position, to allow for windage or drift in sighting the firearm.

The vertical adjustment of the telescope is effected by turning the index member 31 to swing the lever B as has been set forth. But for the purpose of collimation of the telescope, either initial when first constructed, or to take up for wear in the parts or distortion from the use of the gun, an adjustment of the telescope on the lever is obtained by means of the pivot screw 42. By loosening the lock nut 45 and slightly turning the pivot screw 42, the telescope will swing on the axis of the screw or worm 48, it being elevated or depressed by its engagement with this pivot screw; a very slight amount of play being provided in the bearing at the bottom of the telescope for the pivot member. Then the lock-nut is screwed up tight to secure the screw in adjusted position.

Any desired form of a sighting member or telescope may be used in the device. In the construction shown the telescope is of the type using Porro prisms to offset the objective from the eye-piece. The telescope is shown as provided with an eye-piece lens 60 and an objective 61. The Porro prisms are carried by a holder member 62, consisting of double prisms 63 and 64, causing the optical axis to be four times deflected through ninety degrees.

Having thus described my invention, I claim:

1. In a sighting device for firearms, a support for attachment to the firearm, a lever pivoted on the support, a rotary index member on the support arranged to swing the lever, a cam member secured to the index member and engaging a portion of said lever, and a sighting member mounted on said lever for adjustment on an axis parallel with the axis of the lever.

2. In a sighting device for firearms, a support for attachment to the firearm, a lever pivoted on the support, a rotary index member on the support arranged to swing the lever, and a sighting member mounted on said lever to swing on an axis perpendicular to the axis of the lever, the sighting member being also mounted for adjustment on the lever on an axis parallel with the axis of the lever.

3. In a sighting device for firearms, a support for attachment to the firearm, a lever pivoted on the support, a rotary index member on the support arranged to swing the lever, a sighting member mounted on said lever to swing thereon on an axis perpendicular to the axis of the lever, a screw member carried by the lever, a toothed member carried by the sighting member engaging said screw whereby the sighting member can be swung on said axis by the screw, and means for also swinging the sighting member on an axis transverse to its said axis of movement on the lever.

4. In a sight for firearms, a frame member for attachment to the firearm, a lever pivoted on the frame member to swing in a horizontal axis, means to swing the lever, a sight member, a pivot member connecting the sight member and said lever, a screw rotatably carried by the lever and prevented from endwise movement, a toothed member carried by the sight member and engaging the screw to swing the sight member on its pivot upon rotation of the screw, said pivot member being vertically adjustable on the lever to swing the sight member on the axis of said screw.

5. In a sight for firearms, a frame member for attachment to the firearm, a lever pivoted on the frame member to swing in a horizontal axis, means for swinging the lever, a sight member, a pivot member connecting the sight member and said lever, a screw rotatably carried by the lever and prevented from endwise movement, a toothed member carried by the sight member and engaging the screw to swing the sight member on its pivot upon rotation of the screw, said pivot member being vertically adjustable on the lever to swing the sight member on the axis of said screw, an index carried by said screw, and a pointer on the lever registering with said index.

6. In a sight for firearms, a frame for attachment to the firearm, a lever pivoted to the frame, an index pivoted on the frame and provided with a cam slot, a lug on the lever riding in said slot, a sight member carried by said lever, and a spring carried by the support and engaging the lever to press the lug against one wall of the cam member.

7. In a sight for firearms, a frame for attachment to the firearm, a lever pivoted to the frame, an index pivoted on the frame and provided with a cam, a lug on the lever engaging the cam, uniform graduations on the index member, a sight member carried by said lever, the cam member being shaped to swing the lever according to the uniform graduations on the index, a pivot member connecting the sight member and said lever, a screw rotatably carried by the lever and prevented from endwise movement, and a toothed member carried by the sight member and engaging the screw to swing the sight member on its pivot upon rotation of the screw, said pivot member being vertically adjustable on the lever to swing the sight member on the axis of said screw.

8. In a sight for firearms, a frame for attachment to the firearms, a lever pivoted to the frame, an index pivoted on the frame provided with a cam slot, a lug on the lever riding in said slot, a spring carried by the support and engaging the lever to press the lug against one wall of the cam, uniform graduations on the index member, a sight member carried by said lever, the cam member being shaped to swing the sight according to the uniform graduations on the index, a pivot member connecting the sight member and said lever, a screw rotatably carried by the lever and prevented from endwise movement, a nut member carried by the sight member and engaging the screw to swing the sight member on its pivot upon rotation of the screw, said pivot member being vertically adjustable on the lever to swing the sight member on the axis of said screw.

9. In a sighting device for firearms, a support for attachment to the firearm, a lever pivoted on the support, a rotary index member on the support arranged to swing the lever, a sighting member mounted on said lever to swing thereon on an axis perpendicular to the axis of the lever, a worm member carried by the lever, a worm-wheel segment secured to the sighting member engaging said worm whereby the sighting member can be swung on said axis by the worm, and means for also swinging the sighting member on an axis transverse to its said axis of movement on the lever.

10. In a sight for firearms, a frame member for attachment to the firearm, a lever pivoted on the frame member to swing in a horizontal axis, means to swing the lever, a sight member, a pivot member connecting the sight member and said lever, a worm rotatably carried by the lever and prevented from endwise movement, a worm-wheel segment secured to the sight member and engaging the worm to swing the sight member on its pivot upon rotation of the screw, said pivot member being vertically adjustable on the lever to swing the sight member on the axis of said worm.

AMBROSE SWASEY.

Witnesses:
 DAVID HUNT, Jr.,
 F. F. RICE.